(12) United States Patent
Olsson et al.

(10) Patent No.: US 6,765,670 B2
(45) Date of Patent: Jul. 20, 2004

(54) SPECTROMETER MODULE AND APPLICATIONS THEREOF

(75) Inventors: Bengt-Erik Olsson, Göteborg (SE); Magnus Karlsson, Pixbo (SE); Henrik Sunnerud, Göteborg (SE)

(73) Assignee: Pro Forma Alfa, Göteborg (SE)

(*) Notice: Subject to any disclaimer, the term of this patent is extended or adjusted under 35 U.S.C. 154(b) by 170 days.

(21) Appl. No.: 09/993,661

(22) Filed: Nov. 27, 2001

(65) Prior Publication Data

US 2003/0076493 A1 Apr. 24, 2003

(30) Foreign Application Priority Data

Oct. 23, 2001 (EP) .............................................. 01125128

(51) Int. Cl.⁷ .......................... G01J 3/28; G01N 21/00; H04B 10/08; G01V 1/00; G02F 1/00
(52) U.S. Cl. ...................... 356/327; 356/73.1; 356/303; 356/330; 398/34; 398/70; 398/89; 398/107; 367/64; 359/323; 359/245; 359/251
(58) Field of Search ............................... 356/73.1, 303, 356/327, 330; 398/34, 70, 89, 107; 367/64; 359/245, 251, 323

(56) References Cited

U.S. PATENT DOCUMENTS

| | | | |
|---|---|---|---|
| 6,104,492 A | | 8/2000 | Giles et al. |
| 6,330,375 B1 | * | 12/2001 | Fishman et al. |
| 6,404,537 B1 | * | 6/2002 | Melman et al. |
| 6,411,750 B1 | * | 6/2002 | Fishman et al. |
| 6,417,948 B1 | * | 7/2002 | Chowdhury et al. |
| 6,483,620 B1 | * | 11/2002 | Epworth et al. |
| 6,559,991 B1 | * | 5/2003 | Farley et al. |

FOREIGN PATENT DOCUMENTS

WO    WO 01/02885 A1    1/2001

OTHER PUBLICATIONS

Rossi et al "Optical Performance Monitoring in Reconfigurable WDM Optical Networks Using Sub-carrier Multiplexing" (Journal of Lightwave Technology, vol. 18, No. 12, pp. 1639–1648 (2002)).*

Ippei Shake et al., "Quality Monitoring of Optical Signals Influenced by Chromatic Dispersion in a Transmission Fiber Using Averaged Q–Factor Evaluation" *IEEE Photonics Technology Letters*, vol. 13, No. 4, pp. 385–387 (2001).

Giammarco Rossi et al., "Optical Performance Monitoring in Reconfigurable WDM Optical Networks Using Subcarrier Multiplexing" *Journal of Lightwave Technology*, vol. 18, No. 12, pp. 1639–1648 (2000).

* cited by examiner

*Primary Examiner*—Frank G. Font
*Assistant Examiner*—Khaled Brown
(74) *Attorney, Agent, or Firm*—Burns, Doane, Swecker & Mathis, L.L.P.

(57) ABSTRACT

The present invention relates to a spectrometer module comprising an input, for receiving an incoming optical signal, a variable differential group delay (DGD) element, for applying a variable birefringence retardation to said incoming optical signal, and a detector unit for detecting the power of a signal exiting said variable DGD element, having a defined state of polarization. It also relates to a monitor module, a monitoring unit and a monitoring system, comprising such a spectrometer module for use in monitoring an optical network.

Further, the invention relates to a spectrometer device, for spectrometry purposes, comprising a spectrometer module as stated above.

28 Claims, 5 Drawing Sheets

SPECTROMETER MODULE AND APPLICATIONS THEREOF

TECHNICAL FIELD OF THE INVENTION

This invention relates to a spectrometer module, a monitor module, a monitoring unit and a monitoring system for use in monitoring an optical network.

The invention further relates to a spectrometer device, for spectrometry purposes.

BACKGROUND ART

The use of optical signals for purposes as carrier of information and the like is currently increasing rapidly. Consequently, there is a current need for developing new methods and products for dealing with this kind of information.

One field of technology is fibre optical communication systems, that are used for transferring large amount of information over large distances. Such system comprise a plurality of different network elements, being interconnected to form a communication network. However, as these networks are becoming larger and larger, and including more and more sophisticated network components, the risk for network faults is increasing rapidly. Consequently, there is a need for surveillance systems, keeping track of the optical signals being transmitted in the network, and reporting when an error has occurred.

Furthermore, the communication speed in the optical networks, such as WDM networks are constantly increasing, resulting in the need of less capacity demanding communication protocols. Thereby, existing protocols such as SDH/SONET, having built-in monitoring functions need to be replaced or at least supplemented. This has lead to the development of systems monitoring data in the optical domain.

One such surveillance or monitoring system is described in the patent document U.S. Pat. No. 6,104,492, in which an apparatus and a method of operating an optical signal monitor for WDM networks is disclosed. Here, a temperature tuned filter is used for generating an optical spectrum monitor for multi-wave signals. The tuneable filter is used for selecting the wavelength that is to be detected and monitored.

However, this technique is rather expensive and also relatively slow as it is based on temperature effects. Other known means of measuring the power spectrum is by use of a diffraction grating, which spatially distributes the wavelengths to one or many detectors. The drawbacks of such technology, however, are that expensive detector arrays is required, that the diffraction efficiency might be rather poor, large demands for careful mechanical alignment and as a result less mechanical robustness.

The proposed means of monitoring the signal quality in WDM systems are usually limited to monitoring of the signal power as a function of wavelength, by use of some spectrometer technology, such as e.g. fibre Bragg gratings, such as for example described in the patent document WO 0102885. This spectrometer technology, however, suffers from the same drawbacks as the ones listed above. An alternative monitoring method is further described in "Quality monitoring of optical signals influenced by chromatic dispersion in a transmission fibre using averaged Q-factor evaluation" by I. Shake, H. Takahara, K. Uchiyama, and Y. Yamabayashi, IEEE Photonics Technology Letters, vol 13, pp385–387 (2001). This method, which uses an asynchronous sampling system, is however rather complex and expensive. Yet another proposed method for signal monitoring is described in the document "Optical Performance Monitoring in Reconfigurable WDM Optical Networks Using Subcarrier Multiplexing" by G. Rossi, T. E. Dimmick, and D. J. Blumenthal, Journal of Lightwave Technology, vol 18, pp. 1639–1648 (2000). Also this approach, which is based on a sub-carrier modulation of the signal, is complex and expensive.

SUMMARY OF THE INVENTION

Consequently, an object of this invention is to achieve a spectrometer module, a monitor module, a monitoring unit and a monitoring system for use in monitoring an optical network, overcoming the above-mentioned drawbacks with the prior art.

A further object is to achieve a way of measuring properties of an optical signal, such as power, state of polarisation and degree of polarisation versus wavelength in an efficient way.

Yet a further object is to achieve a spectrometry device, overcoming the drawbacks with the prior art.

Further objects of this invention are evident from the following description of the invention.

The above and other objects are wholly or partly achieved by a spectrometer module comprising:
an input, for receiving an incoming optical signal,
a variable differential group delay (DGD) element, for applying a variable birefringence retardation to said incoming optical signal,
a detector unit for detecting the power of a defined state of polarisation of a signal exiting said variable DGD element.

By using a variable DGD element in a spectrometer module, it is possible to perform measurements on an incoming optical light signal, for detecting parameters such as polarization state and degree of polarisation as a function of the wavelength of the incoming signal.

In accordance with a first embodiment of the invention, said variable DGD element is implemented spatially. Preferably, said variable DGD element comprises a plurality of laterally spaced sub-elements having different optical lengths, whereby different parts of the incoming optical signal is arranged to be transmitted through different sub-elements of the DGD element. Suitably, said incoming optical signal is arranged to have essentially the same width as said variable DGD element, thereby covering each of said laterally spaced sub elements. Thereby, the DGD element is optimally used. Moreover, said variable DGD element suitably comprises a plane incidence surface, being essentially orthogonal to the optical signal path, and a stepped exit surface.

Alternatively, said variable DGD element may comprise a birefringent element having a decreasing thickness in a direction being transverse to said incoming optical signal. Thereby different parts of the optical signal beam experiences different optical paths. Preferably, said detector unit comprises an array of detectors, and a lens that is placed between said variable DGD element and said detector unit, whereby said detector array is arranged in the Fourier focal plane of said lens. Furthermore, said incoming optical signal is suitably arranged to be slightly divergent.

According to a second embodiment of the invention, said variable DGD element is implemented temporally, by use of an electrical control signal that changes the DGD with time.

Preferably, said variable DGD element is comprised by a birefringent system, being essentially sandwiched between a first and a second reflective element, whereby said incoming optical signal is arranged to be reflected between said reflective elements one or more times before outputted from said birefringent system. Suitably, said first and second reflective elements are constituted by a first and second mirror element, respectively. Alternatively, said first and second reflective elements are constituted by a first and a second retroreflector, respectively. By using the above reflections systems, the same birefringent element may by utilized many times.

In accordance with preferred embodiments, a polarizer is arranged between said variable DGD element and said detector unit, said polarizer not being aligned relative to the birefringence eigenaxes of said DGD element. Moreover, said incoming optical signal preferably has a polarisation so as to inject light in both birefringence eigenaxes of said variable DGD element.

Preferably, said variable DGD element is manufactured from an electro-optical birefringent material. Furthermore, said variable DGD element is suitably arranged between a first and a second electrode, said electrodes being arranged to generate an electric field over said variable DGD element. Thereby, a variable DGD element is achieved, being easy to control by means of an electronic control unit or the like. Alternatively, said variable DGD element may be connectable with an acusto-optic transducer, for achieving the above controllability.

Furthermore, said detector unit is preferably connectable with an electronic processing device, in which a detected signal may be processed to extract information regarding properties such as power, state of polarisation and degree of polarisation of said incoming optical signal as a function of wavelength.

The above and other objects of the invention are also achieved wholly or in part by a spectrometer device for measuring the optical spectrum of an optical signal, characterised in that said spectrometer device comprises a first and a second spectrometer module as described in above, and a polarisation splitter, whereby said polarisation splitter is arranged to split said optical signal into a first and a second signal segments, whereby said first signal segment is arranged to be inputted to said first spectrometer module, and said second signal segment is arranged to be inputted to said second spectrometer module. Thereby, the inventive spectrometer module may be used for pure spectrometry, analysing partly or arbitrary polarised light. Such a device may for example be used in the fields of chemistry, process industry, astronomy or pharmaceutical industry, or in any other field in which spectrometry is applied.

Further, the above and other objects are wholly or partly achieved by a monitor module for measuring properties such as power, state of polarisation and degree of polarisation of an incoming optical signal as a function of wavelength, said monitor module comprising:
a polarisation control module being connected with a control unit,
a spectrometer module, being connected with said control unit, and
a polariser being placed between said polarisation control module and spectrometer module.

Preferably, said spectrometer module is as described above. Such a monitor module may for example be used for monitoring the above parameters in an optical network, such as an WDM network. Suitably, said polarisation control module comprises:

a first birefringent element,
a second birefringent element,
each of said birefringent elements being connected with a power source for individual control of the birefringence of said first and second birefringent element, respectively. According with an embodiment, the birefringent eigenaxes of said second birefringent element is rotated by 45 degrees in relation to the birefringent eigenaxes of said first birefringent element. Alternatively, the birefringent eigenaxes of said first and second birefringent elements are coinciding, and a quarter wave element, being rotated by 45 degrees in relation to the birefringent eigenaxes of said birefringent elements, is arranged between said first and second birefringent elements.

The above and other objects are also wholly or partly achieved by a unit for monitoring an optical signal, being transmitted in an optical network, said unit comprising:
a coupler, being arranged to be inserted along a optical transmission path of said optical network, said coupler having a main in- and output, respectively, for receiving and transmitting said optical signal and at least one drop output, to which a portion of said optical signal is droppable, said drop output being connected with one of a spectrometer module as described above and a monitor module as described above. Such a monitoring unit may be installed in an optical network, in a position which is desired to monitor.

Finally, the above and other objects are also wholly or partly achieved by a monitoring system for an optical network, comprising a plurality of network elements, such as transmitters, receivers, transmission lines, amplifiers or the like, said monitoring system comprising:
two or more monitoring stations, each of said monitoring stations being positioned between two network elements of said optical network and each of said stations comprising one of a spectrometer module as described above, a monitor module above and a monitoring unit as described above and
a monitoring hub, being connected with each monitoring station, said hub being arranged to receive measured signal data from each of said monitoring stations, and said monitoring hub comprising a processing unit for processing said measured signal data.

Alternatively, the objects are wholly or partly achieved by a monitoring system for an optical network, comprising a plurality of network elements, such as transmitters, receivers, transmission lines, amplifiers or the like, said monitoring system comprising:
two or more monitoring stations, each of said monitoring stations being positioned between two network elements of said optical network, each of said stations being arranged to measure power, state of polarisation and degree of polarisation of an optical signal entering said monitoring station via said network,
a monitoring hub, being connected with each monitoring station, said hub being arranged to receive measured signal data from each of said monitoring stations, and said monitoring hub comprising a processing unit for processing said measured signal data.

Thereby, the invention may be used for gaining information regarding the function of an entire network, for example enabling quick location of faults.

The above monitoring system as well as the above monitoring module may be used for monitoring signal data quality in a wavelength division multiplexed (WDM) fibre optical communication system. Further, the spectrometer module above may be used as a standalone spectrometer device, as stated above.

Finally, the above objects are wholly or partly achieved by a method of monitoring and measuring properties such as power, state of polarisation and degree of polarisation of an incoming optical signal as a function of wavelength, the method comprising the steps of:

inputting said incoming optical signal to a variable DGD element, applying a variable birefringence retardation to said incoming optical signal by letting it pass said variable DGD element, and detecting the power of the signal exiting said variable DGD element, having a determined state of polarisation.

Preferably, said variable DGD element is comprised in a spectrometer module as described above. Moreover, the method suitably comprises the step of dropping said incoming optical signal from a wavelength division multiplexed (WDM) fibre optical communication system that is to be monitored.

BRIEF DESCRIPTION OF THE DRAWINGS

Currently preferred embodiments of the present invention will now be described in closer detail, with reference to the accompanying drawings.

DETAILED DESCRIPTION OF PREFERRED EMBODIMENTS OF THE INVENTION

Figure 1:
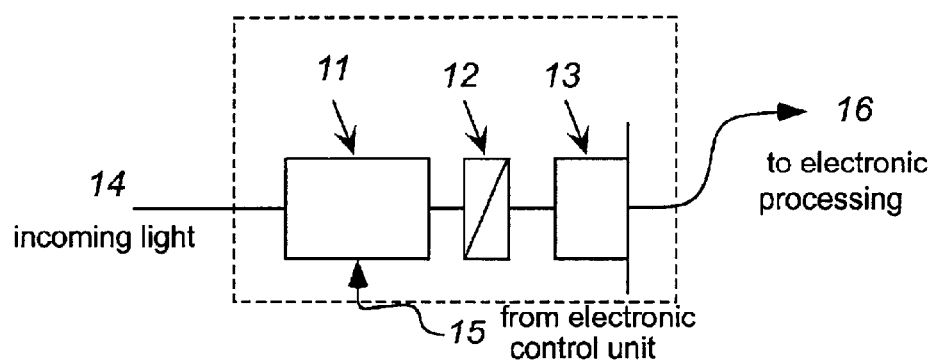
FIG. 1 is a schematic drawing of a first embodiment of the inventive spectrometer module.

A schematic drawing of a spectrometer module in accordance with the invention is shown in FIG. 1. The spectrometer module comprises a variable DGD (differential group delay) element 11 and a detector unit 13. This embodiment also comprises a polarizer 12, being arranged between said variable DGD element 11 and said detector unit 13 and being nonaligned with the birefringent axes of the DGD element.

An incoming light signal 14, having a determined, well-defined state of polarisation may be inputted to said variable DGD element 11, having birefringent eigenaxes. In the embodiment shown in FIG. 1, the variable DGD element is electrically variable, meaning that an electric field may be applied over said DGD element 11, in order to change the birefringence of said variable DGD element 11. For this purpose, the variable DGD element is arranged between a first and second electrode (not shown) being connected with an electronic control unit. However, it shall be mentioned that other ways of achieving a variable DGD are possible. For example, an acoustic-optical transducer (not shown) may be connected with said variable DGD element 11 in order to change the birefringence of the DGD element 11 by applying an acoustic or mechanical wave through the DGD element 11.

The incoming optical signal is arranged to have such a polarisation state that light is injected in both birefringence eigenaxes of said variable DGD element 11. Thereby, the optical signal will experience birefringence when propagating through said variable DGD element 11. Furthermore, the experienced birefringence may be varied by for example applying an electrical field over the variable DGD element 11.

After the variable DGD element, the optical signal is arranged to pass said polarizer 12, whereafter the power of said optical signal is detected by means of said detector unit 13.

Consequently, the power spectrum of the incoming optical signal 14 may be deduced by putting the variable DGD element in a plurality of birefringence states, by for example applying different electrical fields to the DGD element, and measuring the corresponding detector power level for each birefringence state. The purpose of the spectrometer module is to extract the wavelength spectrum of the incoming optical signal 14, i.e. to obtain the power level at the various optical wavelengths. To do this a variable birefringence retardation is applied to the signal. The polarization state of a signal after passing such an element will vary periodically with the optical frequency, with a period given by 1/DGD where DGD is the differential group delay of the element. If the DGD in the birefringent element is electrically tunable, a tunable optical transfer function is achieved. After passing the polarizer, the wavelength components of the optical signal will attenuate differently, depending on what DGD has been applied. Consequently, the signal reaching the detector unit will be dependant upon the wavelength contents of the signal as well as upon the applied DGD. Thus, by measuring the detected power after a polarizer for many different values of the DGD, we will be able to compute the power spectrum of the signal. This is the physical background for the spectrometer module described in this document.

Furthermore, by outputting the power information from said detector unit 13 to an electronic processing unit 16, other parameters, such as power spectrum, state of polarisation and degree of polarisation of the incoming optical signal may be computed.

Figure 3:
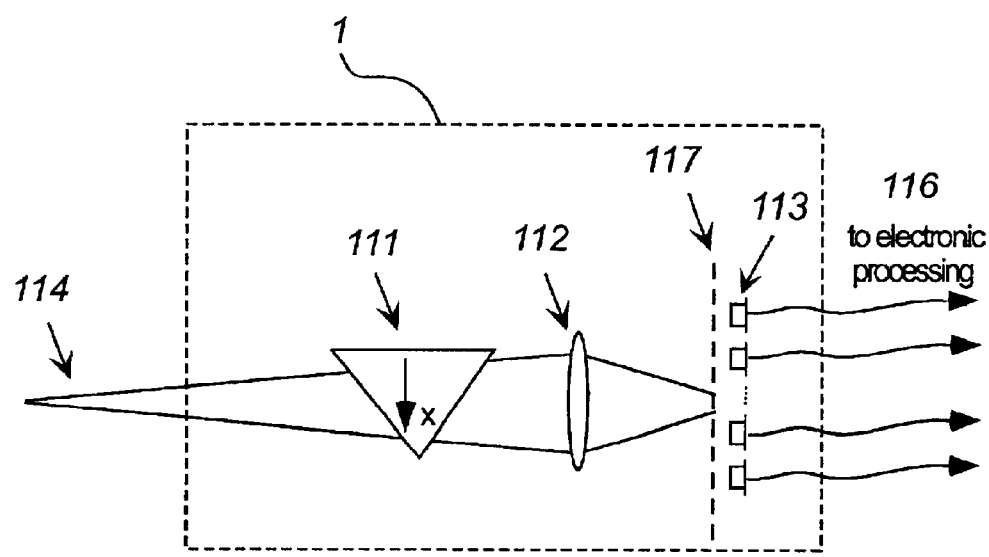
FIG. 3 is a schematic drawing of a second embodiment of the inventive spectrometer module.

A second embodiment of the invention is shown in FIG. 3. In this case, an incoming, polarized, slightly diverging optical signal beam 114 is arranged to hit a birefringent element 111, which has continuously decreasing thickness (and thereby differential group delay) in one transverse direction (denoted x in the figure) related to the signal path. The polarization state after such a birefringent element 111 will continuously change spatially in the x-direction, with a rotation rate determined by the wavelength of the signal. Using a lens 112 this spatial polarization rotation will be transformed to a point in a Fourier (focal) plane 117 of the lens 112, where the signal hits a detector array 113. Each detector of this array 113 will then measure the power of a certain wavelength of the signal. In this embodiment an electrically controlled DGD as in the above described first embodiment is not necessary, but one uses a detector array to separate the wavelengths spatially.

Figure 4:
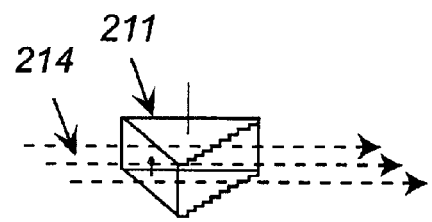
FIG. 4 is yet another schematic drawing of a third embodiment of the inventive spectrometer module showing only a spectrometer section of said module.

A detail of a third embodiment of the invention is shown in FIG. 4, showing only the DGD element. This fig shows an embodiment in which variable DGD is implemented spatially. Here, an incoming optical signal beam 214 is sufficiently wide so that it fills the entire width of a birefringent crystal 211, constituting a variable DGD element. Further the incoming optical signal is polarized at an angle of 45 degrees in relation to the polarization axis of the DGD element 211. This element is electro-optically birefringent, with a birefringence that is adjustable by applying an electric field over one of its main axes. Furthermore, the DGD element 211 is laterally divided into sub-elements of different length so that the beam feels different differential group delays over its different parts. After the DGD element 211, the signal is arranged to hit a polarizer (not shown) as in FIG. 1, oriented at 45 degrees with respect to the birefringent eigenaxes of the DGD element (7.2). Finally the optical signal beam is arranged to be detected by a detector as in FIG. 1. By monitoring how the detected power changes with applied voltage over the variable DGD element 211 the power spectrum can be deduced, as described above. The exact realization of this measurement technique can be varied according to e.g.

Arranging several detectors in the lateral direction, each detecting the a signal segment from a particular sub-element.

Arranging several electrodes on the birefringent DGD element, so that the birefringence in the sub-elements can be individually controlled.

Arranging a lateral polarization controller in front of the DGD elements 211 so that the polarization state in to each sub-element can be controlled.

Figure 5:
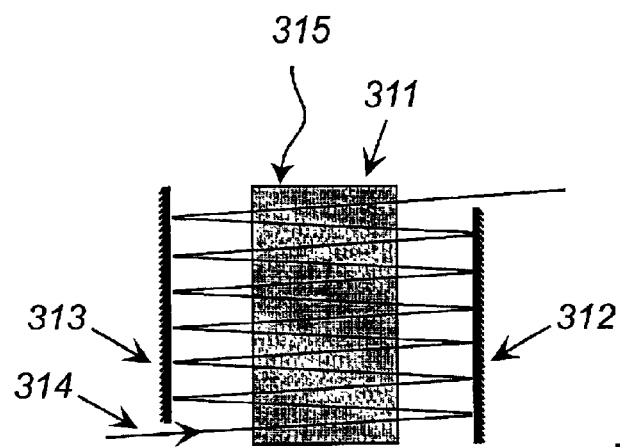
FIG. 5 is a schematic drawing of a fourth embodiment of the inventive spectrometer module showing only a spectrometer section of said module.

A fourth embodiment of a DGD element for use in a spectrometer module according to the invention is shown in FIG. 5. Here, a voltage controls the differential group delay of a birefringent element directly. An efficient way of doing this is to use a multipass structure, in which the light passes the same birefringent element several times. In the implementation shown in FIG. 5, an incoming optical light signal 314, having a well-defined state of polarization, is arranged to bounce back and forth between a first and a second mirror 312,313 with a slightly tilted beam propagation direction, so that the beam 314 hits a birefringent system 311, being arranged between said mirrors 312,313, several times. The birefringent system 311 may contain an arbitrary set of birefringent and electrically controlled elements in any orientations, but it must contain a minimum of two birefringent elements of which at least one should have a differential group delay. Additionally, one birefringent element is electrically controlled by means of an electrical control unit. By electrically altering the birefringence of this electrically controlled element, the net birefringence of the multipass structure as a whole will be altered, and thereby an electrically controllable DGD element has been realized. The maximum amount of DGD that can be achieved in this manner will be the equal to the DGD of the birefringent system 311 times the number of passes through this system 311. This kind of multipass structure may replace the DGD element 11 in a structure as shown in FIG. 1.

Figure 6:
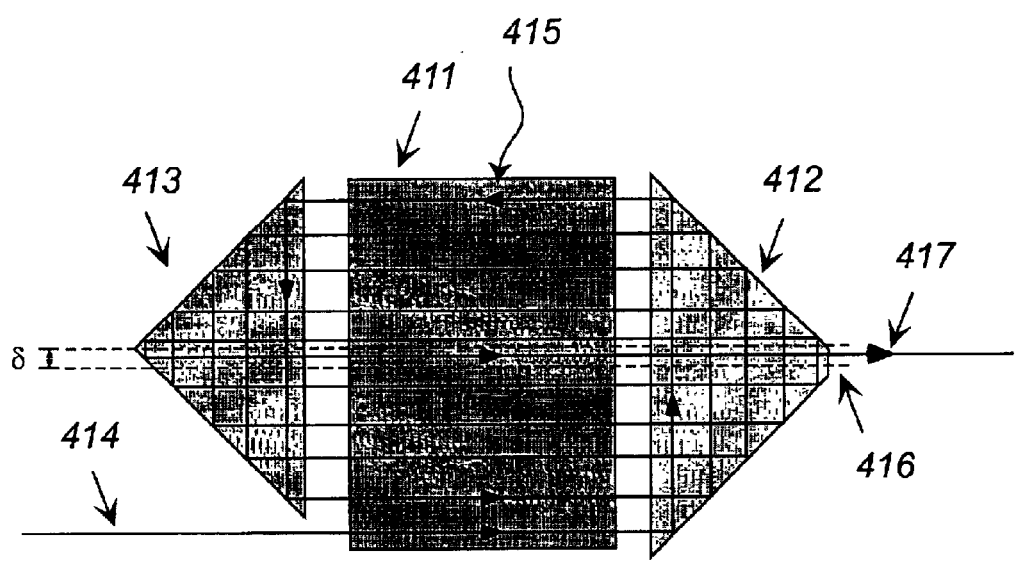
FIG. 6 is a schematic drawing of a fifth embodiment of the inventive spectrometer module showing only a spectrometer section of said module.

A fifth embodiment of a DGD element for use in a spectrometer module according to the invention is shown in FIG. 6. This embodiment shows an implementation of a multi-pass structure, using retroreflectors. It is functionally similar with the embodiment shown in FIG. 5. In this embodiment, a incoming optical light signal 414 is reflected between a first and a second retroreflector 412,413 of slightly different size, also having a small dealignment δ as shown in the FIG. 6. This enables a spiraling light path as shown in FIG. 6. Between said retroreflectors, an birefringent system 411 is arranged. On each pass of said spiraling light path, the optical light signal hits the birefringent system 411, being electrically controlled by means of an electronic control unit 415, and finally the light signal leaves the system through for example a flat polished corner 416 of said first retroreflector 412. The light may also be arranged to leave the retroreflector by means of a bore or the like (not shown). After leaving the birefringent multi-pass system 411 the light beam 417 will have exhibited a variable DGD that can be controlled by one or several applied voltages from said electronic control unit 415. The birefringent system 411 may comprise an arbitrary set of birefringent and electrically controlled elements in any orientations, but it must contain a minimum of one birefringent element that has a differential group delay and one birefringent element that is electrically controlled. By electrically altering the birefringence of this controllable birefringent element, the net birefringence of the multipass structure as a whole may be altered, and an electrically controllable DGD have been realized. The maximum amount of DGD that can be achieved in this manner will be the equal to the DGD of the birefringent system 411 times the number of passes through this system.

Figure 2:
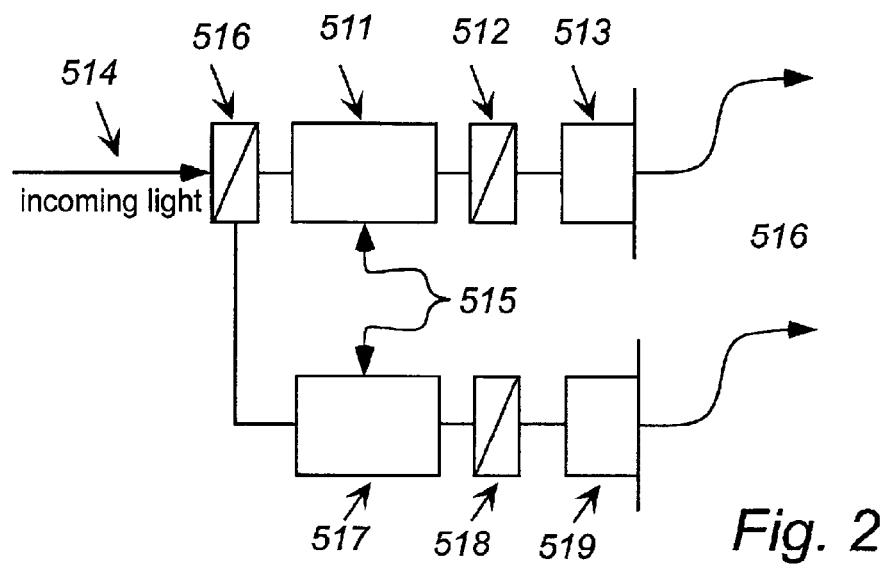
FIG. 2 is an alternative embodiment of the construction as shown in FIG. 1, being independent upon the polarisation of the incoming optical signal.

An alternative embodiment of the invention, of which an example is depicted in FIG. 2, will hereinafter be described. Here, a spectrometer module as shown in FIG. 1, is used to generate a spectrometer device, for use as a standalone system for spectrometry. For such an application it is vital, that the device is independent of the polarization of the incoming light. This may be achieved by using a polarization diversity scheme as shown in FIG. 2. Here, an incoming optical light signal 514 is split into its two orthogonal polarization components by a polarization beam splitter 516, and then entering birefringent DGD elements 511 and 517, respectively, in which the birefringence (and hence DGD) are electronically controlled as described with reference to FIG. 1. The exact realization of those elements 511, 517 is as described with reference to FIG. 1. Then the light is transmitted through polarizers 512,518 respectively, which should be non-aligned with the birefringence eigenaxes of the respective variable DGD element 511, 517. Finally the polarized signal is detected in the photodetectors 513, 519, respectively. The detected signals may thereafter by transmitted to an electronic processing unit 516 for further processing. As such, each branch of the spectrometer device correspond to a spectrometer module as shown in FIG. 1. This spectrometry device allows spectrum analysis of an unpolarised incoming light signal. It shall be noted that although the embodiment shown in FIG. 2 is based on the spectrometer module shown in FIG. 1, a corresponding spectrometry device may also be achieved by utilizing spectrometer modules of any of the embodiments described above and showed in the drawings. It may also be possible to combine two different embodiments in one spectrometry device, one embodiment for each branch, 511–513 and 517–519, respectively. A spectrometer device as described with reference to FIG. 5 is for example usable in the fields of process industry, chemistry, laboratory activity and pharmaceutical industry.

Figure 7:
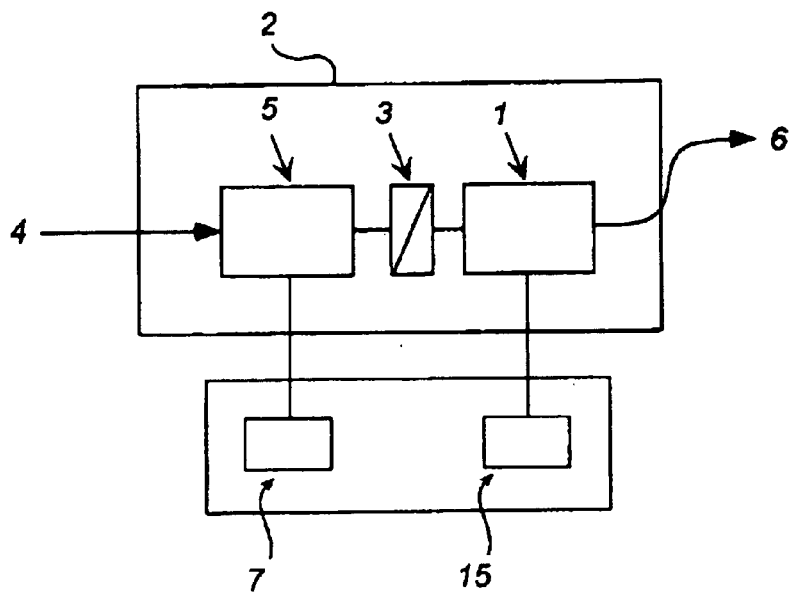
FIG. 7 is a schematic drawing of a monitor module, comprising a spectrometer module as shown in any one of the drawings 1–6.

A spectrometer module 1 as described above with reference to FIGS. 1, 3, 4, 5 or 6 may be comprised in a monitor module 2, as shown in FIG. 7. The purpose of the monitor module 2 is to provide a system that is able to measure power, state of polarization and degree of polarization of an incoming optical signal 4 as a function of wavelength, and in a preferred embodiment the general layout of a monitor module is shown in FIG. 7. The system basically comprises a spectrometer module 1, as described above and a polarization control module 5, as will be closer described above. Further, a polariser 3 is arranged between said polariser control module 5 and said spectrometer module 1. An incoming light signal 4 falls at the polarization control module 5, in which the polarization state of the incoming light signal 4 may be controlled electronically, as will be described below. That section is followed by a polariser 3, that only allows transmission of one polarization state, and consequently the effect of the light emanating from said polariser 3 will power with the settings of the polarization control module. The power of the light emanating from said polariser 3 will thereafter be detected by the spectrometer module 1, as described above. Since the above spectrometer modules 1 are capable of separating different optical wavelengths, it is possible to detect the effect of different wavelength components within the light signal 4. Thereby, it is possible to measure the effect as well as the state of polarization as a function of wavelength of the incoming signal.

The polarization control section is driven by an electric signal from an electronic polarization control unit 7 which changes the polarization state of the incoming light 4 in a controlled manner. The spectrometer module 1 detects the light and determines the power level of the various wavelength components of the signal, and does so for a number of settings of the polarization controller module 5. This will produce the required data, that may be outputted to an electronic processing unit 6. Further the spectrometer module utilizes an electrical control signal from an electronic control unit 15, as described above, to obtain the spectrum. The detection process in the spectrometer module 1 must then be synchronized with the applied control signals from the electronic polarization control unit 7 in order to extract the desired information from the detected signal 4. An alternative operation scheme drives the polarization control module 5 and the spectrometer module 1 at different frequencies, and spectral analysis of the electrical signal from the detector can then be used to extract the desired optical signal properties.

Figure 8A:
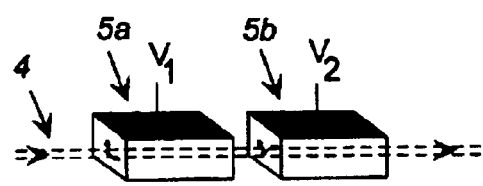
FIGS. 8a and 8b is a schematic view showing two implementations of a polarisation control module, for use in a monitor module as shown in FIG. 7.
Figure 8B:
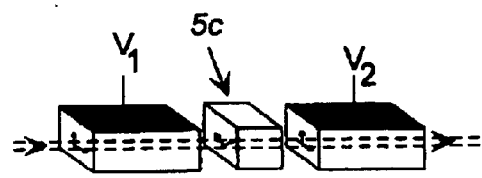

Two embodiments of the polarization control module 5, as described above, will hereinafter be described, with reference to FIG. 8a and FIG. 8b. The incoming light 4 hits a first and a second electrically controlled polarization waveplate 5a, 5b in sequence, said waveplates 5a, 5b being connected with said electronic polarization control unit 7. The waveplates 5a, 5b can be either oriented so that their birefringence axis does not line up, as shown in FIG. 8a, or have aligned birefringence axis but with a quarter-wave retarder 5c being arranged between said waveplate 5a, 5b with dealigned axes as shown in FIG. 5b. Examples of physical implementation of the waveplates 5a, 5b can be electro-optic crystals (in integrated, bulk optics, or liquid crystal fashion), electromechanical fiber squeezers, electromagnetically controlled Faraday rotators, or other schemes as described e.g. in the paper "Polarization-State Control Schemes for Homodyne and Heterodyne Optical Fiber Communications" by T. Okoshi, IEEE J. of Lightwave Technology, pp. 1232–1237, vol. LT-3, 1985, which is hereby incorporated herein by reference. The waveplates 5a, 5b change the polarization state of the signal 4 in a controlled manner, and measurement of the power level after a polarizer will enable the state of polarization to be determined. The function of the polarization control section 5 as shown in FIG. 8a will hereinafter described. The optical signal 4 to be detected falls into a birefringent waveplate 5a, changing the exit polarization state of the signal 4 as a function of an applied voltage V1. The birefringent axes of the waveplates, representing states of polarization that may pass the waveplate unaltered, are shown with arrows in FIGS. 8a–b. Consequently the birefringent axes of the first and second waveplates 5a, 5b are arranged with an angle of 45 degrees in relation to each other, so that light entering the first waveplate 5a along its birefringent axes may be controlled by the second waveplate 5b, having an variable applied voltage V2. In FIG. 8b, said quarter wave plate 5c is arranged to provide the same effect, although the axes of the waveplates coincide. It shall be noted that the above described polarization control module may be used with any spectrometer module, not only the ones being described above.

Figure 9:
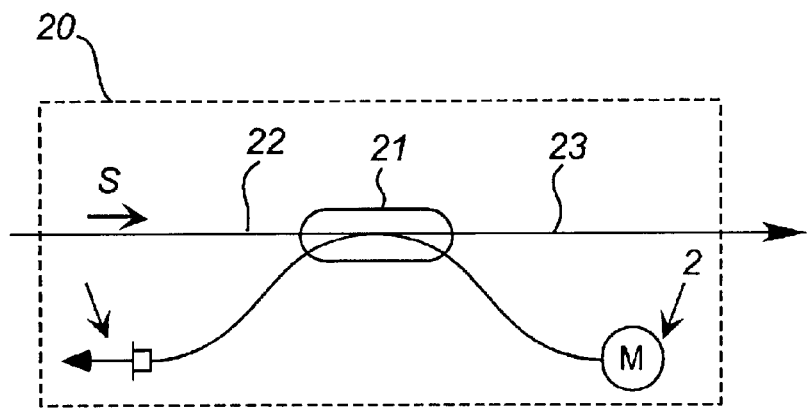
FIG. 9 shows a monitoring unit for insertion in an optical communication system, said monitoring unit comprising a monitoring module as shown in FIG. 7.

A monitor module 2 as described above, and as shown in FIG. 7, may be incorporated in a monitoring unit 20. The monitoring unit 20, as shown in FIG. 9 is intended to be used in a optical communication network, as will be described below. The monitoring unit 20 comprises an optical four-way directional coupler 21 that is connectable with a first and a second transmission line 22, 23 for an optical signal S. By means of said directional coupler 21, a small portion, generally about 1%, may be dropped from the transmission line to a monitor module 2, being connected with one port of said directional coupler 21. This small portion constitutes the incoming light signal 4, falling into the monitor module 2, as described above. Further, an additional small portion of reflected light from the transmission line 22,23 may be detected as well, by positioning a detector 24 in a backward port of the coupler 21, as shown in FIG. 9. Alternatively, for use with a bi-directional transmission line 22,23, transmitting light in both directions, a further monitor module may be positioned in said backward port, instead of said detector (embodiment not shown).

Figure 10:
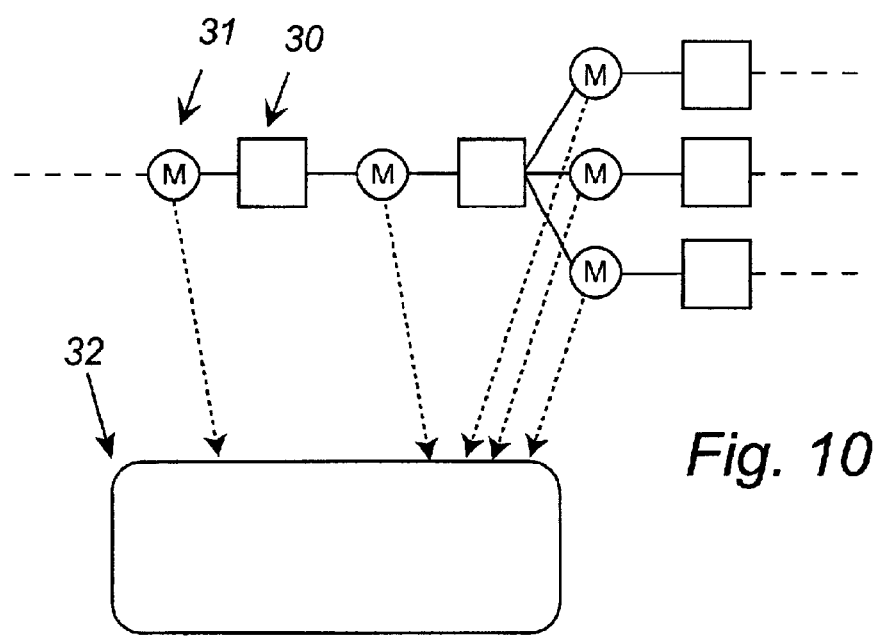
FIG. 10 is a schematic drawing of an optical communication network, in which a plurality of monitoring units as shown in FIG. 9 is used for monitoring optical signal transmission in said network.

According with yet another aspect of the invention, a monitoring system for an optical network is shown in FIG. 10. An optical network consists of a mesh-like structure of network elements 30 being any transmission or signal manipulation component within the network, such as transmitters, receivers, transmission lines or fibers, dispersion compensating fibers, amplifiers, repeaters, regenerators, wavelength converters or optical cross-connects.

Since the transmission of the optical signals through a network depend on a lot of the status of different network elements, it is valuable to known when network elements fail, and how such failures affect the optical signal. Thereby, the inventive monitoring system comprises a plurality of monitoring stations 31, being placed in various positions in said network. The monitoring stations each comprises a monitoring unit as showed in FIG. 9, but may also be constituted by any other construction utilizing a monitor module 2 as described above. Each of said monitoring stations 31 is further connected to a central monitoring hub 32, receiving measured signal data from a plurality of monitoring stations 31, being deployed within said network. An example of such a system including monitor stations is shown in FIG. 10. Here, the monitor stations 31, each comprising a monitoring module 2 are deployed between each network element 30. Each monitoring module 2 is able to measure basic parameters as function of wavelength as described above. For example, for a wavelength-division multiplexed optical network, it is possible to measure wavelength-division multiplexed data at the signal position, such as power, state of polarization and degree of polarization. The measured data from each monitoring module 2 is transmitted to a central monitoring hub 32 in which all monitored data of the transmission link is gathered. Said monitoring hub 32 further comprises a processing unit and an information display unit (not shown).

Given the input from the monitor modules 2 via the monitoring stations 32, the monitoring hub 32 will be able to Present the measured raw data, by means of said information display unit.
Process the measured data by means of said processing unit, thus extracting information about:
  signal power at each WDM (wave-length division multiplexed) channel.
  optical signal to noise ratio at each channel.
  degree of polarization of each channel.
  the wavelength of each channel.
Draw conclusions about network functionality, i.e.
  determine losses.
  determine noise figures and decay in OSNR (optical signal to noise ratio).
  determine polarization mode dispersion (PMD)
  determine distortions from PMD
  determine mechanical motion of network elements
Together with á priori knowledge of the network elements and input signal give information about nonlinearities, dispersive distortion and bit error rate probabilities.
Do all the above as a function of time and thus be able to give information about trends and degradations that might cause outages of the network.

The monitoring system is above described with reference to a wavelength-division multiplexed optical communication network. However, the monitoring system may be used with any communication system in which the above-mentioned measured parameters are of interest.

Further it shall be noted that the spectrometer module as described above may be implemented in other ways than the ones described above, without departing from the scope and spirit of this invention, as described by the appended claims.

Moreover, it shall be explicitly noted that the spectrometer module are not only useful with the monitoring module, unit and system as described above, but may also be used for generating a stand-alone spectrometer device as is shown by way of example in FIG. 2, and as is described above.

As a summary, this document describes a signal monitoring system that uses a polarimeter in the spectrometry of the optical signal, so that the polarization state and the degree of polarization (DOP) can be measured as a function of optical wavelength. This enables unique features of monitoring of the optical signal quality, including for example polarization drift as a result of mechanical movements of the fiber. Furthermore, the DOP measurement enables an alternative way of estimating the optical signal to noise ratio.

The proposed spectrometer module consists of an element of variable birefringence or differential group delay, DGD, which can have other applications than measurements of an optical spectrum. Examples of such applications are compensation for and/or emulation of polarization-mode dispersion, in which a controlled, variable birefringence is of great interest. Previously, variable birefringence has only been possible by using discrete optics, such as two polarizing beam splitters and mechanical delay line. Such implementations suffer from being bulky, expensive and less mechanically robust. Thus the variable DGD here proposed may have applications also outside the main line of the invention.

What is claimed is:

1. A spectrometer module comprising:
   an input, for receiving an incoming optical signal,
   a differential group delay (DGD) element adapted to apply a set of mutually different birefringence retardations to the incoming optical signal,
   a polarizer for selecting a component of polarization from a signal output from the DGD element, and
   a power detector unit for detecting the power in the selected component of polarization of a signal exiting the DGD element, for each retardation applied by the variable DGD element.

2. A spectrometer module as in claim 1, wherein the DGD element includes a plurality of laterally spaced sub elements having different optical lengths.

3. A spectrometer module as claim 2, wherein the incoming optical signal is arranged to have substantially the same width as the DGD element, thereby covering each of the laterally spaced sub elements.

4. The spectrometer module as in claim 2, wherein the DGD element comprises a plane incidence surface that is orthogonal to the optical signal path, and a stepped exit surface.

5. The spectrometer module as in claim 1, wherein the DGD element is part of a birefringent system and is sandwiched between a first and a second reflective element, wherein the incoming optical signal is arranged to be reflected between the reflective elements one or more times before being outputted from the birefringent system.

6. The spectrometer module as in claim 5, wherein the first and second reflective elements include a first and second mirror element, respectively.

7. The spectrometer module as in claim 5, wherein the first and second reflective elements include a first and a second retroreflector, respectively.

8. The spectrometer module as in claim 1, wherein the incoming optical signal have a polarization so as to inject light in both birefringence eigenaxes of the DGD element.

9. The spectrometer module as in claim 1, wherein the DGD element is manufactured from an electro-optical birefringent material.

10. The spectrometer module as in claim 9, wherein the DGD element is arranged between a first and a second electrode structure, the electrodes being arranged to generate an electric field over the DGD element.

11. The spectrometer module as in claim 1, wherein the variable DGD element is adapted to be connected with an acusto-optic transducer.

12. The spectrometer module as in claim 1, wherein the power detector unit is adapted to be connected with an electronic processing device, in which a detected signal may be processed to extract information regarding properties including at least one of power, state of polarization and degree of polarization of the incoming optical signal as a function of wavelength.

13. A spectrometer module comprising:
   an input, for receiving an incoming optical signal,
   a differential group deay (DGD) element adapted to spatially apply a set of mutually different-birefringence retardations to the incoming optical signal,
   an array of detectors for detecting the power in a plurality of spatially separated signals determined by the retardation applied by the DGD element and, a lens placed between the DGD element and the detector array, wherein the detector array is arranged in the Fourier focal plane of the lens.

14. A spectrometer module as in claim 13, wherein the DGD element includes a birefringent element having a decreasing thickness in a direction being transverse to the incoming optical signal.

15. The spectrometer module as in claim 13, wherein the incoming optical signal is arranged to be slightly divergent.

16. A The spectrometer module as in claim 13, wherein the incoming optical signal have a polarization so as to inject light in both birefringence eigenaxes of the DGD element.

17. The spectrometer module as in claim 13, wherein the power detector unit is connectable with an electronic processing device, in which a detected signal may be processed to extract information regarding properties including at least one of power, state of polarization and degree of polarization of the incoming optical signal as a function of wavelength.

18. A spectrometer device for measuring the optical spectrum of an optical signal, comprising:
a first and a second spectrometer module as described in claim 1, and
a polarization splitter, wherein the polarization splitter is arranged to split the optical signal into a first and a second signal segments, and wherein the first signal segment is arranged to be inputted to the first spectrometer module, and the second signal segment is arranged to be inputted to the second spectrometer module.

19. A monitor module for measuring properties including at least one of power, state of polarization and degree of polarization of an incoming optical signal as a function of wavelength, the monitor module comprising:
a polarization control module connected with a control unit,
a spectrometer module as in claim 1, the spectrometer module being connected with the control unit, and
a polarizer placed between the polarization control module and spectrometer module.

20. The monitor module as in claim 19, wherein the polarization control module comprises:
a first birefringent element,
a second birefringent element,
each of the birefringent elements being connected with a power source for individual control of the birefringence of the first and second birefringent element, respectively.

21. The monitor module as in claim 20, wherein the birefringence eigenaxes of the second birefringent element is not aligned in relation to the birefringence eigenaxes of the first birefringent element.

22. The monitor module as in claim 20, wherein the birefringent eigenaxes of the first and second birefringent elements are coinciding, and a quarter wave element that is non-aligned with the birefringence eigenaxes of the birefringent elements is arranged between the first and second birefringent elements.

23. A unit for monitoring an optical signal, being transmitted in an optical network, the unit comprising:
a coupler arranged to be inserted along a optical transmission path of the optical network, the coupler having a main input and output, respectively, for receiving and transmitting the optical signal and at least one drop output, to which a portion of the optical signal is droppable, the drop output being connected with one of a spectrometer module as described in claim 1, and a monitor module as described in claim 19.

24. A monitoring system for an optical network, comprising a plurality of network elements, such as transmitters, receivers, transmission lines, amplifiers or the like, the monitoring system comprising:
two or more monitoring stations, each of the monitoring stations being positioned between two network elements of the optical network and each of the stations comprising one of a spectrometer module as in claim 1, a monitor module as in claim 19 and a monitoring unit as in claim 23 and
a monitoring hub connected with each monitoring station, the hub being arranged to receive measured signal data from each of the monitoring stations, and the monitoring hub including a processing unit for processing the measured signal data.

25. A method of monitoring and measuring properties such as power, state of polarization and degree of polarization of an incoming optical signal as a function of wavelength, the method comprising the steps of:
inputting the incoming optical signal to a DGD element,
applying a variable birefringence retardation to the incoming optical signal by letting it pass the DGD element,
polarizing the signal exiting the DGD element, and
detecting the power of the signal exiting the DGD element, having a determined state of polarization.

26. The method according to claim 25, further comprising the step of: dropping the incoming optical signal from a wavelength division multiplexed (WDM) fiber optical communication system that is to be monitored.

27. A method of monitoring and measuring properties such as power, state of polarization and degree of polarization of an incoming optical signal as a function of wavelength, the method comprising the steps of:
inputting the incoming optical signal to a DGD element,
applying a spatially birefringence retardation to the incoming optical signal by letting it pass the DGD element,
projecting the signal existing the DGD in a focal plane of a lens, and
detecting the power of the signal exiting the DGD element at a plurality of locations in the focal plane.

28. The method according to claim 27, further comprising the step of: dropping the incoming optical signal from a wavelength division multiplexed (WDM) fiber optical communication system that is to be monitored.

* * * * *